Patented Nov. 14, 1944

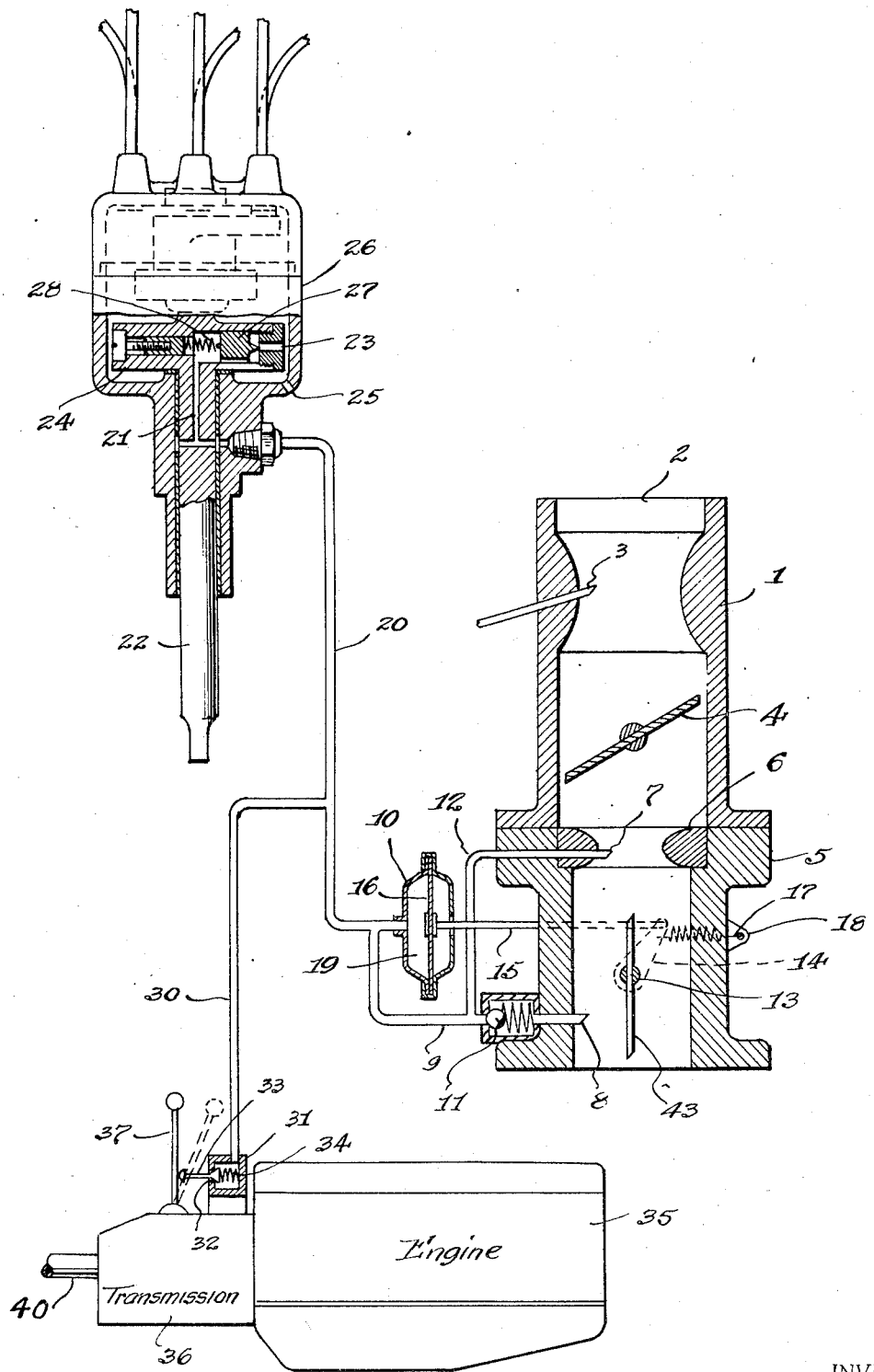

2,362,655

UNITED STATES PATENT OFFICE 2,362,655

GOVERNOR SYSTEM FOR AUTOMOTIVE VEHICLES

Marion Mallory, Detroit, Mich.

Application June 12, 1943, Serial No. 490,616

12 Claims. (Cl. 74—472)

This invention relates to a governor system for an automotive vehicle and more particularly to a governor for an automotive vehicle which will control the vehicle speed as well as the engine speed.

In general practice, the speed of an automotive vehicle is governed by governing the speed of an engine. For example, if it were desired that the speed of the vehicle would be 45 miles an hour, the engine speed would be governed to give the vehicle that speed in high gear. Supposing that an engine speed of 2800 R. P. M. would give a vehicle speed of 45 miles per hour in high gear, and then the vehicle was shifted into a low gear, the engine would not then run 45 miles per hour because the engine speed could not reach a higher speed than 2800 R. P. M. The vehicle speed might be only 20 miles per hour in low gear, which would cause slow acceleration and slow climbing over hills.

In my invention, the engine speed is increased above the speed at which it is governed when in high gear, if it is shifted into low gear.

The drawing is an illustrative showing partly in section of my governor system for an automotive vehicle.

Referring more particularly to the drawing there is shown a carburetor 1 having an air inlet 2, a fuel nozzle 3, a manually controlled throttle valve 4 of the conventional butterfly type, a governor housing 5 mounted at the outlet end of the carburetor and between the carburetor and the engine, a choke ring 6, an orifice 7 positioned in ring 6, orifice 8 positioned in the intake passageway downstream from orifice 7, conduit 9 connecting orifice 8 with suction device 10, a spring-loaded ball check valve 11 located in conduit between orifice 8 and conduit 12, conduit 12 connecting orifice 7 into conduit 9, governor throttle valve 43 of the butterfly type mounted on shaft 13 journaled in housing 5, crank arm 14 fixed on shaft 13 outside of housing 5 and connected by rod 15 with diaphragm 16 in suction device 10. Tension spring 17, one end of which is connected to lug 18 on housing 5 and the other end of which is connected to crank 14, tends at all times to open valve 43.

Chamber 19 in suction device 10 is arranged to communicate with atmosphere through conduit 20, passageway 21 in distributor shaft 22, orifice 23 in valve housing 24 mounted on shaft 22 and orifice 25 in the distributor housing 26. Distributor shaft 22 is run directly off of engine 35 so that the speed of shaft 22 varies directly with the speed of the engine. Orifice 23 is controlled by centrifugally unbalanced valve 27 which tends to close orifice 23 when the engine speed reaches or exceeds the predetermined desired governed speed of the engine. Tension spring 28 tends at all times to hold valve 27 open.

The operation of the device as thus far described briefly is as follows: When the engine is operating below its governed speed, valve 27 is open thereby bleeding suction device 10 to atmosphere through orifices 25, 23, passageway 21 and conduit 20. When governor valve 43 is open or nearly open there will be little vacuum between it and the engine and the ball check valve 11 will be closed. When the speed of the engine reaches a predetermined desired governed speed, the high velocity through choke ring 6 by orifice 7 builds up a suction in suction device 10 which starts valve 43 toward a closed position, causing a build-up in vacuum between engine and valve 43. This higher vacuum at orifice 8 opens the ball check valve 11 which increases the power of suction device 10, causing valve 43 to close more rapidly. The increased suction in suction device 10 in conduit 20 tends to hold valve 27 slightly off its seat. As above stated, valve 27 closes completely momentarily but, as the vacuum increases due to closing of valve 43, valve 27 is drawn slightly away from its seat, which plays the role of a slight air bleed to suction device 10, preventing valve 43 from plastering shut which would cause the engine to fall far below its governed speed. If the speed of the engine begins to decrease due to an increased load, the centrifugal force on valve 27 will decrease, permitting this valve to open wider and bleeding suction device 10 to atmosphere, which permits valve 43 to move toward an open position. If the governor were installed on an engine and centrifugal valve 27 were adjusted to close at 2800 engine R. P. M., that would be the approximate engine speed; and if the engine gave a vehicle speed of 40 miles per hour at 2800 R. P. M. in high gear, the vehicle speed would be much lower if it were operated in a lower gear—perhaps too low for acceleration or climbing hills in low gear. To overcome this objection, which is common in most engine governors, I provide additional means for bleeding suction device 10 when the vehicle is in low gear, through conduit 30 to atmosphere. Communication between conduit 30 and atmosphere is controlled by a valve comprising housing 31 having an orifice 32 to atmosphere, a valve 33 controlling orifice 32 and urged to closed position by compression spring 34.

The engine is designated 35 and the transmission 36. Transmission 36 is controlled by a lever 37 and preferably is of the variable speed sliding gear type conventionally used in automotive vehicles. Valve 33 is positioned so that whenever gear shift lever 37 is actuated to shift the transmission into one of its lower speeds, and when lever 37 is in lower gear or speed position, as indicated in the dotted line position, lever 37 opens valve 33 thereby bleeding suction device 10 to atmosphere and causing governor valve 43 to open. However, as soon as gear shift lever 37 is operated to shift the engine transmission out of one of its lower speeds or gears into neutral or one of its higher speeds, then valve 33 closes orifice 32 and the governor is then effective to control the speed of the engine 35. Thus by air bleeding suction device 10 to atmosphere through conduit 30 and orifice 32 whenever the engine is operating in one of its lower gears or speeds, the road speed of the vehicle can be accelerated to the point at which shifting to a higher speed or gear is facilitated.

If desired the governor can remain ineffective as long as the vehicle is in lower gear, but preferably the governor will still control the engine speed even though the vehicle is in a lower gear. The governed speed of the engine in low gear will depend on the size of air bleed orifice 32, i. e., the extent to which suction device 10 is air bled to atmosphere. Orifice 32 may be of such size as to bleed suction device 10 just enough to permit the engine R. P. M. to be 3300 in low gear. It is also possible to bleed suction device 10 so that the engine speed would be 3300 R. P. M. in low gear and 3000 in second gear by using a mechanical arrangement that would open orifice 32 wider in first gear than in second.

The propeller shaft for the vehicle is designated 40.

I claim:

1. In combination with an internal combustion engine having an intake passageway, a governor for controlling the speed of said engine including a throttle valve in said passageway, a suction device actuated through changes of pressure obtaining in said intake passageway for imparting movement to said throttle valve, a variable speed transmission for said engine, and means for subjecting said suction device to atmospheric pressure when the transmission is operating in low speed whereby said engine can run at a higher speed when the transmission is operating in low speed than when the transmission is operating in high speed.

2. In combination with an internal combustion engine having an intake passageway, a governor for controlling the speed of said engine and controlled by the pressure conditions obtaining in said intake passageway, a variable speed transmission for said engine, and means for subjecting said governor to atmospheric pressure when the transmission is operating in low speed whereby said governor controls the engine at a higher speed when the transmission is operating in low speed than when the transmission is operating in high speed.

3. In combination with an internal combustion engine having an intake passageway, a governor for controlling the speed of the engine controlled by the pressure conditions obtaining in said intake passageway, a variable speed shiftable gear transmission for said engine, and air bleed means controlled by said transmission for air bleeding said governor to atmosphere when the transmission is operating in low gear whereby said engine can run at a higher speed when the transmission is operating in low gear than when the transmission is operating in high gear.

4. In combination with an internal combustion engine having an intake passageway, a governor for controlling the speed of the engine including a throttle valve in said passageway, a suction device actuated through changes of pressure obtaining in said intake passageway for imparting movement to said throttle valve, a variable speed shiftable gear transmission for said engine, and air bleed means controlled by said transmission for air bleeding said suction device to atmosphere when the transmission is operating in low gear whereby said governor controls the engine at a higher speed when the transmission is in low gear than when the transmission is in a higher gear.

5. In combination with an internal combustion engine having an intake passageway, a governor valve in said passageway for controlling the charge to the engine, a suction device connected to said governor valve, a conduit connecting the suction device into the intake passageway whereby the governor valve is controlled by the pressure conditions obtaining in said intake passageway, a variable speed shiftable gear transmission for said engine, an air bleed to atmosphere for said suction device, a valve mechanism controlling said air bleed, said valve mechanism being open when the transmission is in low gear and closed when the transmission is operating in high gear whereby the engine can run at a higher speed when the transmission is in low gear than when the transmission is in high gear.

6. In combination with an internal combustion engine having an intake passageway, a governor valve in said passageway for controlling the charge to the engine, a suction device connected to said governor valve, a conduit connecting the suction device into the intake passageway whereby the governor valve is controlled by the pressure conditions obtaining in said intake passageway, a variable speed shiftable gear transmission for said engine, an air bleed to atmosphere for said suction device, a valve mechanism controlling said air bleed, said valve mechanism being open when the transmission is in low gear and closed when the transmission is operating in high gear, said air bleed being of such size that the suction device is only partially bled to atmosphere when the valve mechanism is open and the engine reaches the desired governed speed when the transmission is in low gear, whereby the governed speed of the engine when the transmission is in low gear is higher than when the transmission is in high gear.

7. The combination as set forth in claim 4 including a second air bleed to atmosphere for said suction device controlled by a centrifugally unbalanced valve which tends to shut off said second air bleed to atmosphere when the engine reaches its predetermined desired governed speed.

8. The combination as claimed in claim 5 including a gear shifting mechanism for shifting the gears of said transmission, and a connection between said gear shifting mechanism and the air bleed valve for opening said valve when the gear shifting mechanism is actuated to shift the transmission into low gear.

9. The combination as set forth in claim 5 including a gear shift lever for shifting the gears of said transmission, and a connection between the air bleed valve and said gear shift lever whereby the valve is open when the gear shift lever is in low gear position and whereby the valve is closed when the gear shift lever is in high gear position.

10. In an internal combustion engine having an intake passageway, a valve for controlling the flow of fluid through said passageway, a suction operated device connected to said valve, a conduit connecting the suction device into the intake passageway on the engine side of said valve, a second conduit for connecting the suction device with the intake passageway on the atmosphere side of said valve, and valve means controlled in accordance with the speed of the engine for bleeding said conduit to atmosphere whenever the engine falls below a predetermined speed and tending to close said conduit to atmosphere whenever the engine reaches a predetermined speed whereby the suction device moves the governor valve towards closed position to maintain the desired governed speed of the engine, a variable speed transmission for said engine and a second air bleed means controlled by said transmission for air bleeding said suction device to atmosphere when the transmission is operating in low gear whereby said engine can run at a higher speed when the transmission is operating in low gear then when the transmission is operating in high gear.

11. In an engine governor having an intake passageway, a governor valve in said passageway, an orifice between the governor valve and the engine, an orifice between the governor valve and the atmosphere, a conduit connecting said orifices, a suction device for controlling said governor valve and connected into the said conduit, a connection between the suction device and the governor valve, an outlet to atmosphere for said conduit, a valve for controlling said outlet, and centrifugal means operated in accordance with the speed of the engine for opening said valve when the engine falls below a predetermined speed to bleed said orifices and the suction device to atmosphere and for closing said valve when the engine speed increases to a predetermined speed whereby the suction device is effective to move said governor valve toward closed position, a variable speed transmission for said engine and a second air bleed means controlled by said transmission for air bleeding said suction device to atmosphere when the transmission is operating in low gear whereby said engine can run at a higher speed when the transmission is operating in low gear than when the transmission is operating in high gear.

12. In an internal combustion engine having an intake passageway, a governor valve for controlling the flow of fluid through said passageway, a suction operated device connected to said governor valve, a conduit connecting the suction device into the intake passageway on the engine side of the said governor valve, a second conduit connecting the suction device with atmosphere, and a centrifugally unbalanced valve operated in accordance with the speed of the engine for controlling communication between the second conduit and atmosphere, said centrifugally unbalanced valve tending to close said second conduit to atmosphere whenever the engine attains a predetermined speed whereby the suction device responds to move said governor valve toward closed position, a third conduit connecting the suction device into the intake passageway on the atmosphere side of the governor valve, a variable speed transmission for said engine and an air bleed means controlled by said transmission for air bleeding said suction device to atmosphere when the transmission is operating in low gear whereby said engine can run at a higher speed when the transmission is operating in low gear than when the transmission is operating in high gear.

MARION MALLORY.